US008170533B2

(12) United States Patent
Link et al.

(10) Patent No.: US 8,170,533 B2
(45) Date of Patent: *May 1, 2012

(54) METHODS AND APPARATUS OF OVER-THE-AIR PROGRAMMING OF A WIRELESS UNIT

(75) Inventors: Charles M. Link, Atlanta, GA (US); Stephen Thomas Hardin, Suwanee, GA (US); Megan Koch Klenzak, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/414,552

(22) Filed: Mar. 30, 2009

(65) Prior Publication Data

US 2009/0187972 A1 Jul. 23, 2009

Related U.S. Application Data

(63) Continuation of application No. 10/031,126, filed as application No. PCT/US99/13459 on Jun. 15, 1999, now Pat. No. 7,536,173, and a continuation-in-part of application No. PCT/US98/20428, filed on Sep. 30, 1998.

(51) Int. Cl.
*H04M 1/66* (2006.01)
*H04M 1/68* (2006.01)
*H04M 3/16* (2006.01)

(52) U.S. Cl. ........ 455/411; 455/410; 455/418; 455/419; 455/420; 713/168; 380/247; 380/249

(58) Field of Classification Search .......... 455/410–411, 455/418–420; 380/247, 249; 713/168–176
See application file for complete search history.

(56) References Cited

U.S. PATENT DOCUMENTS 4,099,033 A 7/1978 Murray
(Continued)

FOREIGN PATENT DOCUMENTS

DE 9217379.9 11/1992
(Continued)

OTHER PUBLICATIONS

Rivest. "The MD4 Message-Digest Algorithm." Internet RFC 1321. Apr. 1992.

(Continued)

*Primary Examiner* — Tuan A Tran (57) ABSTRACT

Methods and apparatus for secure over-the-air (OTA) programming, and particularly, activation, of a wireless unit in a particular communications system. The unit stores a stored key having been generated by using a key algorithm (K-algorithm) with an identifier associated with the unit as an input to the K-algorithm. The unit may receive information such as parameters and a verification number from a communications system for the purpose of programming the unit. The verification number is generated by using an authorization algorithm (A-algorithm) having the parameters and a key as A-algorithm inputs. They key is generated by the K-algorithm having the identifier associated with the K-algorithm input. In response to the receipt of the parameters and the verification number, the wireless unit generates a trial verification number by using the A-algorithm with the parameters and the stored key as trial inputs. The unit compares the verification number to the trial verification number for a match. When finding the match, the unit uses the parameters for programming of the unit in the particular communications system. When failing to find the match, the unit fails to use the parameters for the programming.

19 Claims, 3 Drawing Sheets

U.S. PATENT DOCUMENTS

| | | | |
|---|---|---|---|
| 4,291,197 A | 9/1981 | Yonaga | |
| 4,453,042 A | 6/1984 | Wolf et al. | |
| 4,532,507 A | 7/1985 | Edson et al. | |
| 4,593,155 A | 6/1986 | Hawkins | |
| 4,724,537 A | 2/1988 | Monet | |
| 4,736,419 A | 4/1988 | Roe | |
| 4,908,848 A | 3/1990 | Hanawa | |
| 4,945,556 A | 7/1990 | Namekawa | |
| 5,068,889 A | 11/1991 | Yamashita | |
| 5,159,625 A | 10/1992 | Zicker | |
| 5,276,729 A | 1/1994 | Higuchi et al. | |
| 5,297,192 A | 3/1994 | Gerszberg | |
| 5,341,426 A | 8/1994 | Barney et al. | |
| 5,373,289 A | 12/1994 | Ichinohe | |
| 5,386,468 A | 1/1995 | Akiyama et al. | |
| 5,390,252 A | 2/1995 | Suzuki et al. | |
| 5,457,737 A | 10/1995 | Wen | |
| 5,467,398 A | 11/1995 | Pierce et al. | |
| 5,481,610 A | 1/1996 | Doiron et al. | |
| 5,513,245 A | 4/1996 | Mizikovsky et al. | |
| 5,594,778 A | 1/1997 | Schaupp, Jr. et al. | |
| 5,600,708 A | 2/1997 | Meche et al. | |
| 5,603,084 A * | 2/1997 | Henry et al. | 455/419 |
| 5,613,012 A | 3/1997 | Hoffman et al. | |
| 5,646,604 A | 7/1997 | Maruyama et al. | |
| 5,673,317 A | 9/1997 | Cooper | |
| 5,742,669 A | 4/1998 | Lim | |
| 5,749,052 A | 5/1998 | Hidem et al. | |
| 5,784,464 A | 7/1998 | Akiyama et al. | |
| 5,793,866 A * | 8/1998 | Brown et al. | 380/2 |
| 5,794,139 A * | 8/1998 | Mizikovsky et al. | 455/403 |
| 5,835,858 A | 11/1998 | Vaihoja et al. | |
| 5,850,445 A | 12/1998 | Chan et al. | |
| 5,864,757 A * | 1/1999 | Parker | 455/418 |
| 5,875,394 A * | 2/1999 | Daly et al. | 455/411 |
| 5,887,251 A * | 3/1999 | Fehnel | 455/411 |
| 5,930,362 A | 7/1999 | Daly et al. | |
| 5,970,144 A * | 10/1999 | Chan et al. | 380/247 |
| 5,991,407 A | 11/1999 | Murto | |
| 6,125,273 A * | 9/2000 | Yamagishi | 455/411 |
| 6,130,622 A | 10/2000 | Hussey et al. | |
| 6,157,826 A | 12/2000 | Lee | |
| 6,199,161 B1 | 3/2001 | Ahvenainen | |
| 6,393,270 B1 | 5/2002 | Austin | |
| 6,550,010 B1 | 4/2003 | Link et al. | |
| 7,536,173 B1 | 5/2009 | Link et al. | |

FOREIGN PATENT DOCUMENTS

| | | |
|---|---|---|
| DE | 9217379 U1 | 4/1993 |
| EP | 0532227 A2 | 9/1992 |
| EP | 0532227 A1 | 3/1993 |
| EP | 0652681 A2 | 5/1995 |
| EP | 0675615 | 10/1995 |
| EP | 0675615 A1 | 10/1995 |
| EP | 0652681 A3 | 3/1996 |
| WO | 92/12584 A1 | 7/1992 |
| WO | 97/22221 A2 | 6/1997 |

OTHER PUBLICATIONS

TIA IS-54 Appendix A "Dual-mode Cellular System: Authentication, Message Encryption, Voice Privacy Mask Generation, Shared Secret Data Generation, A-Key Verification, and Test Data." Feb. 1992.

Cromwell. "Privacy and Authentication for Digital RF Links", RF Cryptography, Sep. 1998, pp. 22-30.

European Telecommunication Standard; European digital cellular telecommunications system (Phase 2); Technical realization of the Short Message Services (SMS) Point to Point (PP) (GSM 03.40) pp. 1-103 (Oct. 1993), ETSI.

European Telecommunication Standard; European digital cellular telecommunications system (Phase 2); Technical realization of the Short Message Service Cell Broadcast (GSM 03.41) (GSM 03.40), pp. 1-24 (Oct. 1993), ETSI.

IS-136 Revision 1A (Telecommunications Industry Association) Jun. 1996.

IS 136 Revision 2A (Telecommunications Industry Association) Jun. 1996.

Cellular-Phone Coverage Expands to 35 Countries, The Wall Street Journal, p. B9 (Nov. 8, 1995).

Brochure entitled "PCS 19000: Tomorrow's Technology-Today," The North American PCS 1900 Action Group (NPAG).

TIA; IS-136 Revision A (Telecommunications Industry Association); Jun. 1996, 384 pages.

TIA; IS-136 Revision 2A (Telecommunications Industry Association); Jun. 1996, 422 pages.

TIA; IS-54 Appendix A "Dual Mode Cellular System : Authentication, Message Encryption, Voice Privacy Mask Generation, Shared Secret Data Generation, A-Key Verification, and Test Data" Feb. 1992, 27 pages.

European Telecommunication Standard, "European Digital Cellular Telecommunications System (Phase 2); Technical Realization of the Short Message Service (SMS) Point to Point (PPP) (GSM 03.40)," Oct. 1993, 103 pages.

Austin; Notice of Allowance and Fee Due, mailed Nov. 20, 2001, for U.S. Appl. No. 08/950,389, filed Oct. 14, 1997.

Link; Final Rejection mailed Feb. 7, 2008, for U.S. Appl. No. 10/031,126, filed Aug. 19, 2003.

Dreher; "PCS 1900: Tomorrow's Technology—Today"; The North American PCS 1900 Action Group (NPAG) Pamphlet, 8 pages.

The Wall Street Journal; Cellular Phone Coverage Expands to 35 Countries, Nov. 8, 1995; p. B9.

Mouly. "The GSM System for Mobile Communications", European Telecommunication Standard European Digital Cellular Telecommunications System (Phase 2), Technical Realization of Short Message Service Cell Broadcast (SMSCB) (GSM 03.41), France, Oct. 1993, p. 1-24.

Rivest. The MD5 Message Digest Algorithm, Internet RFC 1321, Apr. 1992, pp. 1-21.

Austin. U.S. Appl. No. 08/950,389, filed Oct. 14, 1997.

Austin. Non-Final Rejection Mailed Mar. 5, 1999, U.S. Appl. No. 08/950,389, filed Oct. 14, 1997.

Austin. Non-Final Rejection Mailed Oct. 5, 1999, U.S. Appl. No. 08/950,389, filed Oct. 14, 1997.

Austin. Non-Final Rejection Mailed Jun. 21, 2000, U.S. Appl. No. 08/950,389, filed Oct. 14, 1997.

Austin. Non-Final Rejection Mailed Mar. 14, 2001, U.S. Appl. No. 08/950,389, filed Oct. 14, 1997.

Austin; Notice of Allowance and Fee Due, mailed Jan. 22, 2002, for U.S. Appl. No. 08/950,389, filed Oct. 14, 1997.

Link. U.S. Appl. No. 10/031,126, filed Aug. 19, 2003.

Link; Non-Final Rejection mailed Oct. 10, 2006, for U.S. Appl. No. 10/031,126, filed Aug. 19, 2003.

Link; Final Rejection mailed Apr. 10, 2007, for U.S. Appl. No. 10/031,126, filed Aug. 19, 2003.

Link; Non-Final Rejection mailed Jul. 12, 2007, for U.S. Appl. No. 10/031,126, filed Aug. 19, 2003.

Link. U.S. Appl. No. 09/497,584, filed Feb. 3, 2000.

Link; Non-Final Rejection mailed Oct. 4, 2000, for U.S. Appl. No. 09/497,584, filed Feb. 3, 2000.

Link; Notice of Allowance and Fee Due, mailed Jul. 2, 2001, for U.S. Appl. No. 09/497,584, filed Feb. 3, 2000.

Link; Notice of Allowance and Fee Due, mailed Dec. 26, 2001, for U.S. Appl. No. 09/497,584, filed Feb. 3, 2000.

OA dated Feb. 23, 2009 for U.S. Appl. No. 11/611,028, 5 pages.

OA dated Oct. 30, 2008 for U.S. Appl. No. 11/611,028, 9 pages.

OA dated Jan. 9, 2008 for U.S. Appl. No. 11/611,028, 22 pages.

International Search Report for PCT Application No. PCT/US 99/13459, mailed Mar. 3, 2000, 2 pages.

\* cited by examiner

METHODS AND APPARATUS OF OVER-THE-AIR PROGRAMMING OF A WIRELESS UNIT

CROSS-REFERENCE TO RELATED APPLICATION

This application is a continuation of U.S. patent application Ser. No. 10/031,126 filed Jun. 11, 2002 (and having a 35 U.S.C. 371(c) date of Aug. 19, 2003), and entitled "METHODS AND APPARATUS FOR OVER-THE-AIR PROGRAMMING OF A WIRELESS UNIT," which was filed as a national stage application of PCT/US99/13459, filed Jun. 15, 1999, which is entirely incorporated herein by reference, and which is a continuation-in-part of International Application No. PCT/US98/20428, filed Sep. 30, 1998, which was nationalized as U.S. application Ser. No. 09/497,584, which was filed on Feb. 3, 2000 and which issued as U.S. Pat. No. 6,550,010 on Apr. 15, 2003. This application is also related to pending U.S. patent application Ser. No. 11/611,028 filed Dec. 14, 2006 and entitled "METHODS AND APPARATUS OF OVER-THE-AIR PROGRAMMING OF A WIRELESS UNIT." The entireties of the above-referenced applications are hereby incorporated by reference.

TECHNICAL FIELD

The present invention relates to wireless units used in wireless and other communications systems, and particularly, relates to the over-the-air programming of a wireless unit with respect to a particular wireless communications system and/or by a particular service provider.

BACKGROUND

The advance of technology in telecommunications has allowed a large segment of the population to own and to use wireless units operating on communications systems. Wireless units such as cellular telephones and personal communication system (PCS) devices have been particularly popular. The delivery of service to these wireless units by service providers is a competitive yet profitable endeavor. Service providers continue to seek ways to satisfy customers, and to improve and manage wireless service.

One manner in which service providers have sought to better obtain and serve customers is to provide for retail outlets where a customer may purchase a wireless unit and/or have a wireless unit activated for use. A specific retail outlet may sell wireless units from many different manufacturers, but typically, a retail outlet has an exclusive relationship with a particular service provider. As part of this exclusive relationship, the retail outlet activates wireless units purchased at the retail outlet only on the network or system of the particular service provider. In other words, generally, when a customer purchases a wireless unit at a specific retail outlet, the wireless unit is activated so that wireless communications service to that wireless unit is provided by the service provider that has an exclusive relationship with the specific retail outlet.

Similarly, the retail outlet may serve a customer by activating on the network or system of the particular service provider a wireless unit that has been purchased or obtained elsewhere. For example, a customer may be unhappy with his/her service from a specific service provider. At the end of a contract period or at other times, the customer may seek out a retail outlet so as to change service providers by being activated on the network or system of a different service provider.

In return for activation, the service provider typically pays the retail outlet a commission for each sale and activation or activation of a wireless unit. This commission often is not insignificant with respect to the purchase price of a wireless unit.

Another manner in which service providers seek to obtain customers is to offer a subsidy with respect to the purchase price of a wireless unit when the wireless unit is activated on the network or system of the service provider. For example, a wireless unit's retail cost without subsidy may be $300. A service provider may subsidize the cost of the wireless unit by $100 or more so long as the wireless unit is activated on the network of the service provider. Of course, the service provider anticipates that it will recoup its subsidy as a result of the business relationship with the customer. This subsidization has been welcomed by many customers as a way in which to obtain a wireless unit that may otherwise be too expensive to purchase.

These two manners to better obtain and serve customers are often combined: (1) a retail outlet may sell (or give away) wireless units whose costs are underwritten by subsidies paid by a particular service provider for activation of the units on the network of the particular service provider; and (2) the retail outlet may be paid a commission for each such subsidized wireless unit that is sold and activated on the network of the particular service provider.

Yet, there are disadvantages associated with the use of a retail outlet with respect to the sale and/or activation of a wireless unit. From the customer's perspective, the purchase and/or activation process at the retail outlet takes a relatively long period of time. Another disadvantage is that the purchase and/or activation process must be accomplished during the business hours of the retail outlet. Typically, business hours coincide with a customer's workday schedule or carry over into the early evening hours when the customer may be interested in following other pursuits. Thus, from a customer's perspective, the purchase and/or activation of a wireless unit in a retail outlet has at least the disadvantages of consuming time and energy during hours when a customer is most likely to be engaged in other pursuits.

The purchase and/or activation of a wireless unit in a retail outlet has disadvantages from the retail outlet's perspective as well. The retail outlet may sell other products or have other business than the wireless units. The purchase and/or activation process with respect to a wireless unit takes time and takes sales clerks away from the other business of the retail outlet. Further, the retail outlet may be required to obtain special equipment, programs, databases, and/or tables to sell and/or to activate the wireless units. The retail outlet must train personnel to use and to keep such special equipment and information confidential. The special equipment and information and the training and confidentiality thereof may overburden the retail outlet.

The purchase and/or activation of a wireless unit in a retail outlet also has disadvantages from the perspective of a service provider. A service provider typically must pay a not insignificant commission to the retail outlet for each wireless unit that is purchased and/or activated to the network of the service provider. Another disadvantage is the service provider generally must take some monitoring steps with respect to the retail outlet to assure the purchase and/or activation processes do not lead to abuses such as theft of confidential information relating to the wireless units and/or to customers.

There are alternatives to the purchase and/or activation of a wireless unit in a retail outlet. One such alternative is to allow a customer rather than the retail outlet to activate a wireless unit that he or she has purchased at a retail outlet, through a catalog, or wherever. This alternative is welcomed by the many customers who do not want to spend the time for the lengthy purchase and/or activation processes to be carried out in a retail outlet. But this alternative has a principal disadvantage. The wireless units sold without accompanying activation are sold generally without a subsidy. In other words, a customer who desires to avoid the lengthy purchase and/or activation processes at the retail outlet typically has to forego the savings offered by the considerable subsidy of wireless units sold in retail outlets.

Some service providers have subsidized the sale of wireless units pursuant to a locked system of wireless units. To activate such a wireless unit, it must be unlocked. The process or instructions for unlocking the wireless unit may be obtained from the service provider that subsidizes the purchase of the wireless unit, may be obtained from the seller of the wireless unit as part of the sale, and/or may be provided by the wireless unit in response to entry of a secret code that may be provided by the service provider or the retail outlet or otherwise obtained. As part of the unlocking process, the wireless unit is activated to the network of the particular service provider providing the unlocking instructions (or as agreed with the associated seller of the wireless unit). Pursuant to this locked system, the service provider offers a subsidized wireless unit for sale to a customer, and also allows the customer to activate the wireless unit at his or her convenience. The service provider gains from this locked system in that the service provider is generally able to recoup the subsidy by having the wireless unit activated to the network of the service provider, thereby providing wireless service to the wireless unit.

A problem with locked wireless units is that some customers may find it difficult to overcome the lock and/or to manage the unlocking/programming of the wireless unit. One solution to this problem has been described in the patent to Vaihoja et al., U.S. Pat. No. 5,835,858. Vaihoja et al. describes an operator assisted programming feature for the activation of a wireless unit. Vaihoja et al. describes a problem that a customer may have in programming a wireless unit such as entry of incorrect information through the keypad that may result in inoperability of the unit. To solve this problem, Vaihoja et al. offers a solution that includes a checking code calculation feature which enables the customer to carry out the operator assisted programming and to check whether he or she has entered the information correctly. Unfortunately, this checking code calculation feature adds further programming and otherwise generally complicates the operation of the wireless unit.

In addition, service providers are finding they may be unable to always count on recouping the subsidy paid with respect to a locked wireless unit. The lock on the wireless unit may be circumvented by those who desire the subsidy from the service provider, but do not desire to be activated on the network of the service provider. Such circumvention may be the result of a too-wide distribution of the unlocking process of a particular type of locked wireless unit. For example, all of the same types of wireless units may be unlocked according to the same unlocking process. Once a person gains knowledge of the unlocking process, (legitimately or illegitimately), he or she may pass on knowledge of the unlocking process to others or use the process to unlock other locked wireless units of the same type.

Another way to circumvent the lock of a locked wireless unit is to use a "back door" into the programming of the locked wireless unit so as to unlock the wireless unit without having to first obtain the unlocking process. A back door is an access to the programming of the wireless unit designed to allow for easy repair or service of the wireless unit. Thus, a locked wireless unit may be "locked" for all intents and purposes, but may be unlocked without resorting to the unlocking process provided by the service provider that subsidized the purchase of the wireless unit. As a result, the wireless unit may not be activated to the network of the service provider paying the subsidy, and the service provider does not recoup such subsidy or otherwise gain from providing wireless service to the wireless unit.

Yet another way to circumvent the lock of a locked wireless unit is to break the lock or break the code that leads to unlocking the wireless unit. The lock or code may be broken in several different ways. The same lock or code may have been used for all of the same types and/or brands of wireless units. To break the lock or code, a person may work through one or more wireless units to find the lock or code. Even though the same lock or code may not have been used for all of the same types and/or brands of wireless units, the same pattern of unlocking a wireless unit using a code may have been used across the same types and/or brands of wireless units. To break the lock or code, a person may work through one or more wireless units to find the pattern, and thus, break the lock or code.

Advantageous ways in which to overcome the problems typically associated with locking/unlocking wireless units are disclosed in the commonly owned patent application of Link et al., entitled "Method and Apparatus for a Unit Locked Against Use until Unlocked and/or Activated on a Selected Network", filed Sep. 30, 1998 with the United States receiving office under the provisions of the Patent Cooperation Treaty (PCT) (Application No. PCT/US98/20428), which patent application is incorporated herein by reference.

As a result of problems with the purchase and/or activation of a wireless unit in a retail outlet, and the problems associated with the locked system of wireless units that allow for user or user-assisted programming, over-the-air (OTA) programming of wireless units has been promoted. OTA programming includes over-the-air activation of a wireless unit. OTA is the subject of TIA/EIA Interim Standards, IS-136 Revision A (Telecommunications Industry Association, Standards and Technology Department, 2001 Pennsylvania Avenue, NW, Washington, D.C. 20006), June 1996 and Addendum, and TDMA Forum Implementation Guide Interim Over-the-Air Activation Version Reference Number 1.1, Dec. 24, 1996, which are incorporated herein by reference.

OTA programming and OTA enables a service provider to program and activate a wireless unit over-the-air, i.e., using communication techniques such as radio frequency (RF) signaling that do not require physical contact or connection between devices of the service provider and the wireless unit. OTA programming is very convenient for customers because they do not have to bring wireless units to retail outlets or service providers for activation and/or programming. Generally, OTA programming requires less participation from a customer than customer (or operator assisted) programming of a wireless unit. Less participation by a customer in programming a wireless unit typically means less opportunity for mistakes in such programming. OTA programming is very convenient for service providers because they do not have to rely on retail outlets for obtaining and/or servicing customers. By decreasing the number of wireless units sold or serviced through retail outlets, a service provider can save money by paying fewer commissions to retail outlets. Also, a service provider's monitoring of retail outlets with respect to abuses such as theft of confidential information, failure to report sales, etc. is reduced with a reduction in the number of retail outlets.

OTA programming of a wireless unit is not without its problems. A wireless unit that accepts OTA programming is subject to being re-programmed by entities other than the service provider with whom the customer may have initially established a relationship. These other entities may be unauthorized and/or unknown entities. For example, a wireless unit may inadvertently accept OTA programming that causes the wireless unit to be activated on a network or system of a service provider different from the service provider which subsidized the cost of the wireless unit. On the other hand, a customer may purchase a subsidized wireless unit from a first service provider, and then allow his or her wireless unit to be programmed such that it receives service from a different service provider. In that case, the original service provider may fail to recoup its investment in the subsidy of the wireless unit.

Service providers generally desire to continue to subsidize the cost of wireless units so as to obtain and/or service customers. But in order to avoid losing the investment in the subsidization of wireless units, some service providers have sought ways in which to prevent OTA programming of a wireless unit except by the particular service provider subsidizing the unit. Some ways to limit OTA programming of a wireless unit to a particular service provider are described in the commonly owned United States patent application of Austin et al., entitled "Network Authentication Method for Over the Air Activation", Ser. No. 08/950,389, filed on Oct. 14, 1997, and incorporated herein by reference.

Another way that has been practiced to limit OTA programming of a wireless unit to a particular service provider is to hardcode a home system operator code into a wireless unit. When the wireless unit powers-on, it searches for a channel that is broadcasting the home system operator code and locks to the channel that broadcasts it. This system operator code search process is advantageous for the customer and the home service provider at least during the initial activation and use of the wireless unit. The customer is provided with an easy activation process, and the home service provider may recoup its subsidy by providing service to the wireless unit. But should the customer become dissatisfied with the service, it is virtually impossible to modify the system operator code in the NAM. The customer cannot readily change service providers without having to acquire a completely different wireless unit. However, a wireless unit that is hardcoded to work only with a particular home service provider may, under limited conditions, be activated with other non-home service providers. Thus, if a retailer ships the product to an area that is not served by the home service provider which provides the subsidy, the customer may be activated for service with the wireless unit by a service provider that is different from the home service provider. If the retailer activates the product on the non-home service provider's system, the home service provider is deprived of the benefit of the subsidy that the home service provider provided for the equipment, and the customer may not be accorded the features, performance, and functionality that ordinarily are available through the home service provider.

Efforts to limit OTA programming of a wireless unit to a particular service provider have also included methods and systems that are used in connection with the system of locked wireless units described above. In other words, a wireless unit may be locked so as to fail to accept OTA programming until the unit is unlocked. For example, a wireless unit may be manufactured so as to include an authentication key. The manufacturer must keep track of the authentication key which is programmed into the wireless unit such as through the use of an authentication key table. The manufacturer provides the particular service provider with the authentication key table. When the customer desires to activate or otherwise program the wireless unit, the customer uses his or her wireless unit to communicate with the service provider. This communication includes a comparison of authentication keys. If they match, then the unit allows itself to be programmed by information from that service provider. If they do not match, the unit does not allow itself to be programmed.

Other processes of authentication between a locked wireless unit and a service provider attempting to program the unit OTA have been developed. For example, a wireless unit may detect a programming or activation attempt by information transmitted to the unit OTA. In response, the wireless unit may challenge the authority of the network or system that is sending information. This challenge may include sending a random number to the network. The network uses this random number, as well as information that is secretly shared between the network and the wireless unit, to generate a response to the challenge request. If the network-generated challenge response matches what the wireless unit believes to be the correct challenge response, then the programming is allowed to continue. The shared secret information between the wireless unit and the network is known generally as "Shared Secret Data-Subsidy" or "SSD_S." In order for the wireless unit to be able to send the challenge with the random number to the network, the wireless unit must have the capability of sending content bearing messages to the network.

As with the wireless units that are locked against unauthorized manual programming, the lock against OTA programming of a wireless unit also may be circumvented in various manners. One manner in which to circumvent the lock against OTA programming is to obtain information on the authentication key, the shared secret data-subsidy (SD_S), or locking procedures from the manufacturer of the units and/or from the service provider. As noted, a manufacturer must keep an authentication key table to keep track of the authentication key which has been programmed into the wireless unit. This table is provided to the service provider. The shared secret data-subsidy (SD_S) and its correlation to a specific wireless unit(s) also must be stored in some fashion. For example, the manufacture and/or the service provider may have to maintain a list of "ESN to SSD_S" values. Security measures with respect to the confidentiality of the authentication key table or to the SSD_S may occasionally slip or be thwarted. Access to this type of confidential information can put an unauthorized user a long way down the road to circumventing the lock against OTA programming. In addition, the creation, safe storage, and safe transmission of such confidential information places an extra burden on the manufacturer and/or the service provider.

In sum, there is a need for a wireless unit whose purchase may be subsidized by a particular service provider, and which may be programmed or activated over-the-air by the particular service provider on its network so the service provider may recoup its subsidy and otherwise derive benefits from the delivery of wireless services to the wireless unit. In addition, there is a need for a wireless unit, which may be locked against over-the-air programming, and which does not allow for circumvention of the lock. In particular, there is a need for a locked wireless unit, which may be unlocked so as to be programmed over-the-air without the need for either the manufacturer or the service provider to set up, maintain, and/or transmit an authentication key table, an ESN to SSD_S list, or the like with respect to information included in the wireless unit, to information that correlates an identifier such as an ESN of a particular unit to values such as SSD_S or the like, and/or to the process of locking/unlocking the unit.

SUMMARY

Generally, the present invention includes methods and apparatus as embodiments relating to a wireless unit that may be locked or otherwise blocked against over-the-air (OTA) programming including activation until the service provider, network, or other communications system transmitting the programming satisfies an authentication process. The exemplary methods and apparatus are described by reference to a wireless unit. The reader is advised the reference to a wireless unit used in a wireless communications system is merely exemplary. The methods and apparatus of the present invention may be used with respect to other types of units that may be locked for various purposes, that are unlocked for programming, activation, use and/or operation in certain circumstances, and that need not be "wireless." For example, the methods and apparatus of the present invention (with appropriate modifications) also may be used with respect to programming of a unit that may take place by manual keypad entry, electronic transfer, or the like. Additional details regarding these other types of units are provided below in the detailed description.

Advantageously, the exemplary methods and apparatus of the present invention allow for a wireless unit whose purchase price may be subsidized by a service provider, and which may be programmed or activated OTA by the service provider on its network so the service provider may recoup its subsidy and otherwise derive benefits from the delivery of wireless services to the unit. In addition, the exemplary methods and apparatus provide for an exemplary wireless unit, which may be locked against OTA programming, and which does not allow for circumvention of the lock. In particular, the exemplary methods and apparatus allow for a wireless unit, which may be unlocked so as to be programmed OTA only by a particular service provider, and specifically, without the need generally for the manufacturer of the wireless unit or the service provider to exchange information as to the unlocking, authentication, and/or activation process. Even more particularly, the exemplary methods and apparatus avoid the need for a service provider and/or a manufacturer to set up, maintain, and/or transmit an authentication key table, an ESN to SSD_S list, or the like with respect: (1) to information included in the wireless unit; (2) to information that correlates an identifier such as an ESN of a particular unit to values such as SSD_S or the like; and/or (3) to the process of locking/unlocking the unit.

More particularly stated, an exemplary wireless unit of the present invention is locked against programming including activation until the service provider, network, or other communications system transmitting the programming satisfies an authentication process. Preferably, as a result of the authentication process, the wireless unit is activated on a network of the particular service provider.

The wireless unit generally includes a memory for storing a stored key specific to the wireless unit. The stored key is used in the authentication process. The stored key may be generated by the wireless unit. Alternatively, a device other than the wireless unit may generate the stored key, and the device may load the stored key into the memory of the wireless unit. Further, the stored key may be generated by using a key algorithm (K-algorithm) with an identifier associated with the wireless unit as an input to the K-algorithm. The identifier may be an electronic serial number (ESN) associated with a wireless unit. When the identifier is unique or relatively unique to the wireless unit, the identifier then is much more difficult to obtain illegitimately. Knowing the identifier of a first wireless unit does not lead to knowledge of the identifier for a second wireless unit.

The memory also may store information such wireless unit parameters including numeric assignment module (NAM) parameters, or other information that relates to the programming of the wireless unit, and in particular, to the activation of the wireless unit on the network of a particular service provider.

Advantageously, the wireless unit's storage of a stored key, which may be generated by using an identifier of the wireless unit with a K-algorithm, is an exemplary feature of the present invention that allows the service provider and manufacturer to avoid having to exchange authentication key tables, ESN to SSD_S lists, and/or the like with respect to any particular wireless unit.

In addition to the memory, the wireless unit generally also includes a control for receipt of information from a service provider, network, or communications system. The information may be received OTA. For example, a customer may be attempting to activate his or her wireless unit. In response, the service provider may transmit information to the wireless unit OTA. The information may include numeric assignment module (NAM) parameters and a verification number. The verification number may have been generated by an authorization algorithm (A-algorithm) having the NAM parameters and a key as A-algorithm inputs. The key may have been generated by a key algorithm (K-algorithm) having an identifier such as an electronic serial number (ESN) associated with the wireless unit as a K-algorithm input.

Advantageously, the service provider's transmission of information, such as NAM parameters and a verification number, to a wireless unit is another feature that allows for the service provider and manufacturer to avoid having to exchange authentication key tables, ESN to SSD_S lists, or the like with respect to any particular wireless unit. The service provider does not need correlation information about a particular wireless unit from the manufacturer. Instead, the service provider receives what it needs for the authentication process from the wireless unit.

For example, when a wireless unit participates in activation, the unit provides the service provider with an identifier such as an ESN. The service provider may use the identifier with the K-algorithm to generate a key. The key may be used with the NAM parameters as inputs to the A-algorithm to generate the verification number. This verification number then may be transmitted to the wireless unit as part of the authentication process. Thus, the service provider does not need to receive or exchange correlation information about a particular wireless unit from the manufacturer. The lack of necessity for receiving or exchanging correlation information between the service provider and the manufacturer makes the authentication process between the wireless unit and the service provider more secure. A security breach cannot occur during transmission or exchange of correlation information from the manufacturer to the service provider because such transmission or exchange does not occur.

In addition to the memory and the control, the wireless unit generally includes a processor that is functionally connected to the control and to the memory. In response to receipt of the information, the processor generates or effects generation of a trial verification number. The trial verification number may be generated by using the A-algorithm with the NAM parameters and the stored key as the A-algorithm inputs. The processor compares or effects the comparison of the trial verification number with at least a portion of the information that has been received. For example, the processor may compare the trial verification number to the verification number received from the service provider.

If a match is found, then the authentication process has been satisfied. The processor then may program or effect the programming of the wireless unit with the information. For example, the processor may store or effect storage of the information such as the NAM parameters in the memory of the wireless unit. The processor may be further used to effect activation of the wireless unit on the network or system of the particular service provider that transmitted the information.

On the other hand, if a match is not found, then the processor may effect a block so the information may not be used to program the wireless unit, or otherwise disallow programming or activation of the wireless unit. Advantageously, the exemplary wireless unit can be programmed OTA, which is a convenience to both the customer and the service provider. Yet, the service provider's investment by way of the subsidy of the wireless unit is protected because the wireless unit can only be programmed or activated by the particular service provider that provides the information that results in the match with the trial verification number. Other service providers or other parties are prevented from OTA programming of the wireless unit.

The present invention also includes exemplary methods for secure over-the-air (OTA) programming or activation of a wireless unit. An exemplary method causes the wireless unit to include a stored key. The stored key may have been generated by using a key algorithm (K-algorithm). An identifier associated with the wireless unit may be used as a K-algorithm input to generate the stored key. The identifier may be the electronic serial number (ESN) of the wireless unit. As a result, the stored key may be unique or relatively unique to the wireless unit.

The exemplary method also allows for information such as wireless unit parameters and a verification number to be received OTA by the wireless unit. The wireless unit parameters may be numeric assignment module (NAM) parameters. The verification number may have been generated by an authorization algorithm (A-algorithm). The wireless unit parameters and a key may be A-algorithm inputs to generate the verification number. The key may have been generated by the K-algorithm. An identifier associated with the wireless unit may be used as a K-algorithm input to generate the key. The identifier may be the electronic serial number (ESN) of the wireless unit. As a result, the key may be unique to the wireless unit.

In response to the receipt of the information such as the wireless unit parameters and the verification number, the wireless unit generates a trial verification number. The wireless unit may generate the trial verification number by using the wireless unit parameters and the stored key, and particularly, by using the A-algorithm with the wireless unit parameters and the stored key as A-algorithm inputs.

The wireless unit compares the trial verification number to the received verification number for a match. If a match is found, then the wireless unit uses the wireless unit parameters for programming the wireless unit. The programming of the wireless unit may include activation of the wireless unit on the network of the particular communication system transmitting the wireless unit parameters and verification number and having satisfied the authentication process. If a match is not found, then the wireless unit blocks programming of the wireless unit, or the wireless unit may fail to use the wireless unit parameters for programming or activation of the wireless unit in the particular communications system.

Another exemplary method of the present invention prevents a wireless unit from being programmed OTA. The wireless unit includes a stored key, which is generated by using a key algorithm (K-algorithm). An identifier such as an ESN uniquely associated with the wireless unit is used as an input to the K-algorithm to generate the stored key. In response to receipt of information, such as NAM parameters, transmitted OTA to the wireless unit, a trial verification number is generated by using an authorization algorithm (A-algorithm). The stored key and the information are used as inputs to the A-algorithm to generate the trial verification number. The wireless unit then compares the trial verification number with at least a portion of the information for a match. In response to failing to find the match, the wireless unit blocks programming, such as activation of the wireless unit.

Accordingly, it is an object of the present invention to provide a wireless unit whose purchase may be subsidized by a particular service provider, and which may be programmed or activated over-the-air (OTA) only by the particular service provider on its network so the service provider may recoup its subsidy and otherwise derive benefits from the delivery of wireless services to the wireless unit.

In addition, it is an object of the present invention to provide methods and apparatus whereby a wireless unit may be locked against unauthenticated OTA programming so as not to allow for the circumvention of the lock. In particular, it is also an object of the present invention to provide methods and apparatus to allow for a wireless unit, which may be unlocked so as to be programmed OTA only by a particular service provider, and particularly, without the need for the manufacturer of the wireless unit and/or the service provider to exchange information as to the unlocking process.

Even more particularly, it is a further object of the present invention to provide methods and apparatus that avoid the need for a service provider and/or a manufacturer to set up, maintain, and/or transmit an authentication key table, an ESN to SSD_S list, or the like with respect: (1) to information included in the wireless unit; (2) to information that correlates an identifier such as an ESN of a particular unit to values such as SSD_S or the like; and/or (3) to the process of locking/unlocking the unit. Yet even more particularly, it is a still further object of the present invention to provide methods and apparatus with respect to a wireless unit whose unlocking process is not distributed except to authorized person(s), which does not include a back door into its programming so that unauthorized unlocking of the wireless unit is avoided, and whose lock cannot generally be broken such as through breaking a stored key that leads to the unlocking of the wireless unit.

That the present invention and the exemplary embodiments thereof overcome the drawbacks set forth above and accomplish the objects of the invention set forth herein will become apparent from the drawings and the detailed description of the embodiments that follow.

DETAILED DESCRIPTION

The present invention includes methods and apparatus as embodiments with respect to a unit that may be locked or otherwise blocked against over-the-air (OTA) programming or other programming including activation until the service provider, network, or other communications system transmitting the programming satisfied certain authentication procedures. This description provides details with respect to exemplary methods and apparatus of the present invention. Advantageously, these exemplary methods and apparatus allow for a unit whose purchase price may be subsidized by a service provider, and which may be programmed or activated OTA only by the service provider on its network so as to recoup its subsidy and otherwise derive benefits from the delivery of services to the unit. In addition, these exemplary methods and apparatus allow for a wireless unit which may be unlocked so as to be programmed OTA only by a particular service provider, and without the need generally for the manufacturer of the wireless unit or the service provider to exchange information as to the unlocking, authentication, and/or activation process.

The exemplary methods and apparatus are described below by reference to any wireless unit that may be used as a communications tool in any wireless communications system. For example, a wireless unit may include a cellular telephone, mobile telephone, mobile station, personal communication system (PCS) device, pager, or the like. A wireless communications system may include any communications system that partially or entirely conveys communications in a wireless manner such as through the use of radio waves, microwaves, or other radio frequency (RF) technology including cellular systems, mobile telephone systems, PCS systems, paging systems, or the like. The reference to a wireless unit used in a wireless communications system in the context of the present invention is merely exemplary. The methods and apparatus of the present invention may be used with respect to other types of units that may be locked for various purposes, that are unlocked, programmed, and/or activated OTA or otherwise for use or operation in certain circumstances, that are not necessarily wireless, and/or that may operate in communications systems other than or in addition to wireless communications systems. In addition, the methods and apparatus of the present invention may be used with respect to systems other than or in addition to wireless communications systems.

For example, the methods and apparatus of the present invention may be used with respect to: (1) a unit in a set top box or other controller associated with a cable or other broadband television or communications service or system; (2) a satellite trans/receiver and satellite system; (3) a news trans/receiver; (4) cable modem and data system; or (5) other such units and/or systems.

Figure 1:
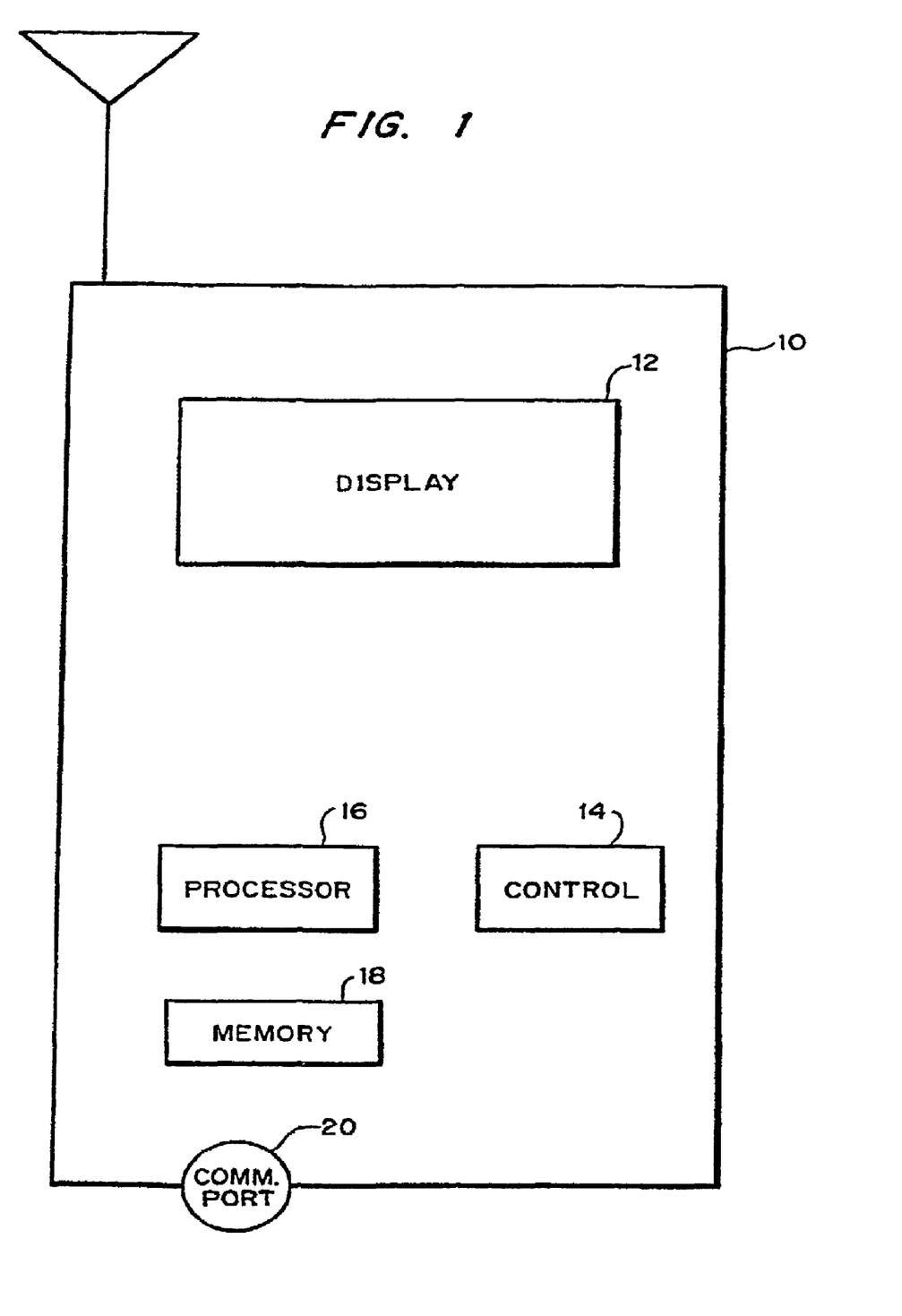
FIG. 1 illustrates an exemplary wireless unit in block diagram form.

An Exemplary Wireless Unit—FIG. 1

Generally stated, an exemplary wireless unit of the present invention is locked or otherwise blocked against OTA programming including activation until the service provider, network, or other communications system transmitting the programming satisfies an authentication process. Preferably, as a result of the authentication process, the wireless unit is activated on a network of the service provider having satisfied the authentication process.

FIG. 1 illustrates an exemplary wireless unit 10 in block diagram form. For example, a representative wireless unit may be an AH270 wireless unit from Mitsubishi Wireless Communications, Inc., Brazelton, Ga., or similar units such as the Microtac or Startac unit manufactured by Motorola, Inc., Libertyville, Ill.; or wireless units manufactured by NEC America, Inc., Richardson, Tex.; Nokia, Tampa, Fla.; Ericsson, Inc., Research Triangle Park, N.C.; or Audiovox Cellular Communications, Hauppauge, N.Y. An exemplary wireless unit 10 generally has the ability to communicate programming data as per Groupe Speciale Mobile (Global System for Mobile Communications or GSM); Code Division Multiple Access (a/k/a Call Division Multiple Access or CDMA); Time Division Multiple Access (TDMA); or other digital format. See also TIA/EIA/IS 136.1 as referenced above.

The block diagram of wireless unit 10 includes a display 12 which may be used to display messages to a user. In addition, the block diagram illustrates typical elements of a wireless unit 10. Particularly, the wireless unit 10 includes a control 14 which represents the control functions generally associated with a wireless unit 10 such as the keypad, the hand set, and the power control switch. Generally, it is through the control 14 that information from a customer using the wireless unit 10 is input into the wireless unit 10. For that reason, the control 14 also may be referred to as the input.

As illustrated, the control 14 is connected to a processor 16, which generally controls the operation of the wireless unit 10. Generally, the processor 16 is a microprocessor or the like which operates in connection with programs or instructions. Such programs or instructions may provide for converting speech signals to digital representations, incorporation of error correcting codes, etc. As is explained below, in the exemplary embodiments, the processor through the use of programs or instructions puts into effect the programming, authentication, and/or activation processes with respect to the wireless unit 10. These programs or instructions may be included in the processor itself, or may be included in other media suitable for holding the programs or instructions and accessible by the control functions of the processor. For example, other such media may include a PROM, EPROM, ROM, FLASH, battery backed CMOS RAM, or an EEPROM. Based on the control functions that the processor 16 executes, the processor 16 also may be referred to as a controller.

As further illustrated in FIG. 1, the processor 16 is at least functionally connected to the memory 18. The memory 18 generally is a storage or data structure for storing data and bits of information. As used in connection with the exemplary embodiments, the memory 18 may be a writable non-volatile memory such as programmable read-only memory EEPROM, battery-backed CMOS RAM, or FLASH, or any other bit storing device. Generally, the memory 18 holds subscriber specific information elements such as an owner number, paging channels, etc. To hold the subscriber specific information elements, the memory 18 may include a Numeric Assignment Module (NAM). The information included in the NAM generally is referenced as the NAM parameters or NAM parameter fields. NAM parameters may include: mobile identification number 1 (MIN1); mobile identification number 2 (MIN2); access overload class (ACCOLC); home system identification (HOME_SID); system operator code (SOC); and a subsidy lock bit. Before the wireless unit 10 may be used for transmitting or receiving communications, the NAM is filled-in with NAM parameters.

As noted, the NAM includes a parameter, the system operator code (SOC), which identifies the network or system of the service provider serving the wireless unit. When a wireless unit is first turned on, typically the service provider with whom the customer contracted exchanges information with the wireless unit so as to supply the appropriate information as NAM parameters to the NAM. This service provider includes its own SOC as a NAM parameter transmitted to the NAM of the wireless unit. The activity of filling-in the NAM information is generally referred to as "activation" of a wireless unit. Activation of a wireless unit to a network or system of a service provider is understood to mean that after the activation the wireless unit receives communications service from that service provider.

Generally, the NAM parameters in a wireless unit may be changed (unless some effort has been made to block such change as in the exemplary embodiments of the present invention). For example, a customer may be dissatisfied with his or her service from a specific service provider, and change to a different service provider. In some cases, the NAM parameters may be changed so that at least the SOC reflects the different service provider. When the SOC is changed, then the different service provider provides communications service to the wireless unit.

Unauthorized changes to a wireless unit's NAM parameters may occur so as to change the identity of the service provider. To prevent such unauthorized changes, exemplary embodiments of the present invention include a subsidy lock bit as a NAM parameter in the NAM. In an exemplary embodiment, when the subsidy lock bit is set to "0", the wireless unit allows its NAM to be programmed (filled-in; written-over) without any of the authentication process generally described below. When the subsidy lock bit is set to "1", the wireless unit does not allow its NAM to be programmed unless an authentication process is satisfied. NAM programming that has passed the authentication process is allowed to re-set the subsidy lock bit, thereby locking the unit after re-programming if the subsidy lock bit is re-set to "1".

In the exemplary embodiments, an identifier of the wireless unit 10 is stored in the memory 18 of the wireless unit 10. The identifier may be the electronic serial number (ESN) of the wireless unit 10. The identifier may be used as input to an algorithm to generate a stored key that is specific to the wireless unit 10 and that is preferably stored in the memory 18. The stored key also may be referred to as the subsidy key, the secret key, or the S-key. The stored key preferably is not viewable on the display of the wireless unit 10 or determinable in any other fashion. In addition, the stored key preferably cannot be altered in the wireless unit.

Generally, the stored key is used as part of the authentication process performed by the wireless unit 10 when information is received for programming the wireless unit. The stored key may be generated by the wireless unit 10. Alternatively, a device other than the wireless unit 10 may generate the stored key, and the device may load the stored key into the memory of the wireless unit. Further, the stored key may be generated by using a key algorithm (K-algorithm) with the identifier associated with the wireless unit such as the ESN as input to the K-algorithm.

Figure 2:
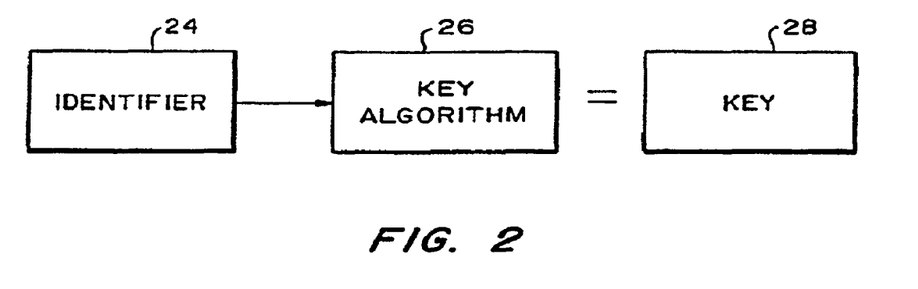
FIG. 2 is a block diagram illustrating an exemplary creation of a key as may be used in exemplary embodiments of the present invention.

Exemplary Creation of a Stored Key—FIG. 2

FIG. 2 is a block diagram illustrating an exemplary creation of a stored key. The identifier 24 is used as input to the K-algorithm 26, which results in the stored key 28. In an exemplary embodiment, the identifier 24 is the ESN having thirty-two bits, and the stored key 28 is sixty-four bits. Preferably, the K-algorithm may be a cryptographic algorithm such as a hash function; Secure Hash Algorithm Version 1 or (SHA1); cryptographic checksum algorithm; cave algorithm, and specifically, the TIA cave algorithm; a message digest (MD5) algorithm; or the algorithm described in the above-referenced Link et al. patent application in connection with FIG. 3 thereof. Generally, such an algorithm yields a pseudo-random output that is deterministic and highly uncorrelated. These characteristics of the algorithm contribute to the unbreakability of the result, such as the key. The unbreakability of the result contributes to the security of the wireless unit.

Further information regarding cave algorithms may be obtained from the following publication, which is incorporated herein by reference: EIA/TIA TR45.0.A *Common Cryptographic Algorithms*, Revision B, Jun. 21, 1995, Washington, D.C. Further information regarding the MD5 algorithms may be obtained from the following publication, which is incorporated herein by reference, "Privacy and Authentication for Digital RF Links." RF Cryptography, *RF Design*, September 1998, and from RSA Data Security, Inc., Redwood City, Calif.

The K-algorithm may be stored in the wireless unit 10. Alternatively, the K-algorithm may be stored elsewhere and supplied for use to the wireless unit 10.

As further illustrated in FIG. 1, the memory 18 is connected to a communications port 20 of the wireless unit 10. Generally, the communications port 20 is an element used to receive and/or to transmit data or information. For example, the communications port 20 may receive programming data or information that is transmitted from a computer system that is used to program the wireless unit 10 during its manufacture or at other times. In addition, the processor 16 may receive OTA information such as programming and/or NAM parameters and a verification number that are part of an effort to program and/or activate the wireless unit 10 to the network or system of a particular service provider. Prior to allowing such programming and/or activation, the wireless unit 10 executes an authentication process. In response to receipt of the information, the processor 16 generates or effects generation of a trial verification number.

Exemplary Creation of a Trial Verification Number

Figure 3:
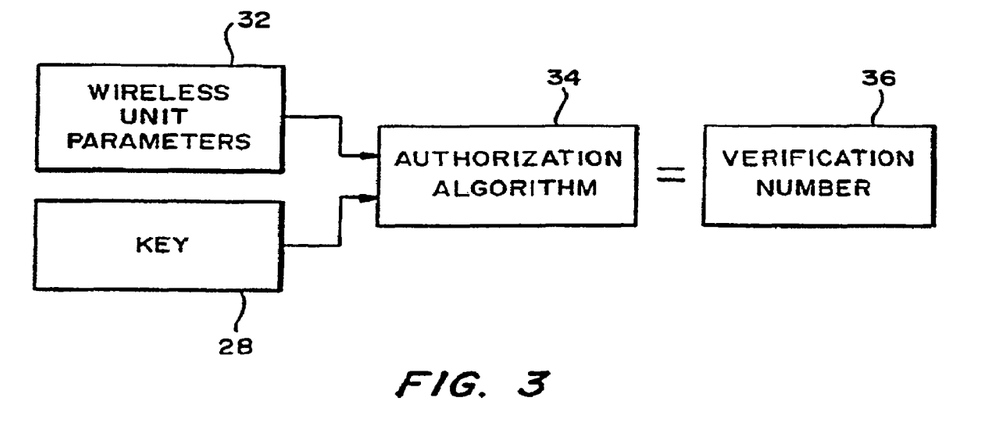
FIG. 3 is a block diagram illustrating an exemplary creation of a verification number as may be used in exemplary embodiments of the present invention.

FIG. 3 illustrates a block diagram of an exemplary creation of a trial verification number. The stored key 28 (whose generation is described above in connection with FIG. 2) is used as input to an authorization algorithm (A-algorithm) 34. In addition, the information or portions of the information that have been received may be used as input to the A-algorithm 34. For example, the information may include wireless unit parameters 32 such as NAM parameters. In an exemplary embodiment, the NAM parameters to be used with the A-algorithm 34 include seventy-two (72) bits as shown in Table 1:

TABLE 1

| Data Elements | Bits |
| --- | --- |
| MIN1 | 24 |
| MIN2 | 10 |
| ACCOLC | 4 |
| Home SID | 15 |
| SOC | 12 |
| Reserved | 6 |
| Subsidy Lock Bit | 1 |
| Total | 72 |

Optionally, in addition to the stored key 28 and the wireless unit parameters 32, a checksum also may be used as input to the A-algorithm for the generation of the trial verification number. The checksum may be a sixteen bit checksum that is generated through the use of a checksum algorithm. The checksum algorithm may have as input or may process all or portions of the information, wireless unit parameters, or NAM parameters received. An exemplary embodiment does not include the Index Code, SSD_C, SSD_S fields, and optional fields as inputs to the checksum algorithm. In addition, the checksum algorithm may include the stored key as input. The sixteen bit output may be used as the checksum input to the A-algorithm for the generation of the trial verification number. An exemplary embodiment ITU-T 16 uses the checksum generation which results in a sixteen bit output. ITU refers to the International Telecommunications Union. CRC refers to a cyclic redundancy check—a process used to check the integrity of a block of data. For further information, see TIA/EIA/IS-136.2-A, "TDMA Cellular/FCS-Radio Interface—Mobile Station—Base Station Compatibility—Traffic Channels and FSK Control Channel," October 1996, Telecommunications Industry Association, Standards and Technology Department, 2500 Wilson Boulevard, Arlington, Va. 22201.

Referring again to FIG. 3, the stored key 28 and the wireless unit parameters 32 may be used as input to the A-algorithm 34, which results in the trial verification number 36. In an exemplary embodiment, the trial verification number 36 is eighteen bits. Preferably, the A-algorithm may be a hash function such as a cave algorithm, and specifically, the TIA cave algorithm; MD5 algorithm Secure Hash Algorithm Ver. 1.0 (SHA1); or the hash function described in the above-referenced Link et al. patent application in connection with FIG. 3 thereof. The A-algorithm may be stored in the wireless unit 10. Alternatively, the A-algorithm may be stored elsewhere and supplied for use to the wireless unit 10. Further, the A-algorithm may be the same or be different from the K-algorithm used to generate the stored key 28.

As part of the authentication process, the processor 16 may compare or effect the comparison of the trial verification number 36 with at least a portion of the information that has been received. For example, the information may include a verification number, and the trial verification number may be compared to the verification number for a match. Preferably, the verification number received OTA as part of the information is generated by or at the service provider in the same manner as the trial verification number is generated by the wireless unit. The service provider determines a key 28 for the particular unit. The key 28 for the unit may be determined by the service provider by using the wireless unit's identifier 24 such as its ESN as input to a K-algorithm 26 to obtain the key 28. To obtain the verification number 36, the key 28 and the wireless unit parameters 32 such as the NAM parameters then are used as input to an A-algorithm 34 to obtain the verification number 36.

Advantageously, the service provider does not need to receive any information from the manufacturer of the wireless unit or to store tables, correlative information, etc. in order to determine the appropriate verification number to send to the wireless unit 10 to pass the authentication process. The service provider may determine a key and a verification number for each wireless unit that contacts the service provider by using the wireless unit's identifier (typically received from the wireless unit), the K-algorithm, the NAM parameters to be programmed into the wireless unit, and the A-algorithm (and optionally a checksum as explained above).

In the comparison between the verification number and the trial verification number, if a match is found, then the authentication process has been satisfied. The processor 16 then may program or effect the programming of the wireless unit with the information. For example, the processor 16 may store or effect storage of the information such as the NAM parameters in the memory of the wireless unit 10. The processor 16 may be further used to effect activation of the wireless unit 10 on the network or system of the particular service provider that transmitted the information.

On the other hand, if a match is not found, then the processor 16 may effect a block so the information may not be used to program the wireless unit, or the processor may otherwise disallow programming or activation of the wireless unit.

Referring again to FIG. 1, the reader is advised that the connections among and between the elements illustrated in FIG. 1 are not necessarily direct connections, but may be functional connections, and these connections are not exclusive of other connections that may exist between or among the illustrated elements or other elements of the wireless unit 10.
Exemplary Method for Programming a Wireless Unit—FIG. 4

An exemplary method for programming a wireless unit is presented in the context of a customer who has purchased a wireless unit and desires to obtain communications service from a particular service provider. This exemplary method is applicable to other situations as well. For example, a customer may use a wireless unit that is served by a specific service provider. A "rogue" or "pirate" service provider may attempt to switch over the unit to its rogue network or system by sending the unit information OTA in an effort to re-program the unit. Advantageously, the exemplary embodiments use an authentication process as generally described in connection with FIG. 4 to preclude such re-programming from taking place.

Refer again to the example of the customer who has purchased a wireless unit and desires to obtain communications service from a particular service provider. A business transaction is conducted between the customer and the service provider whereby the service provider is provided with information as to the customer, and specifically, as to the wireless unit the service provider is to serve. The service provider is provided with an identifier such as the electronic serial number (ESN) of the wireless unit. As those skilled in the art understand, an ESN is assigned to each wireless unit, and this ESN is used in identifying the wireless unit in the course of providing service to the wireless unit. For units that do not include ESNs as identifiers, such units may include respectively indicators, designations, serial numbers or the like as identifiers. Alternatively, an identifier such as the ESN may be stored or associated somewhere else than the memory 18 of the wireless unit 10. The identifier may be unique or relatively unique to the wireless unit. A "relatively unique" identifier may not be unique to the wireless unit in terms of the whole universe of wireless units. Yet, a wireless unit with a relatively unique identifier is unlikely to have the same identifier as another wireless unit operating in the same area, system, or network.

Figure 4:
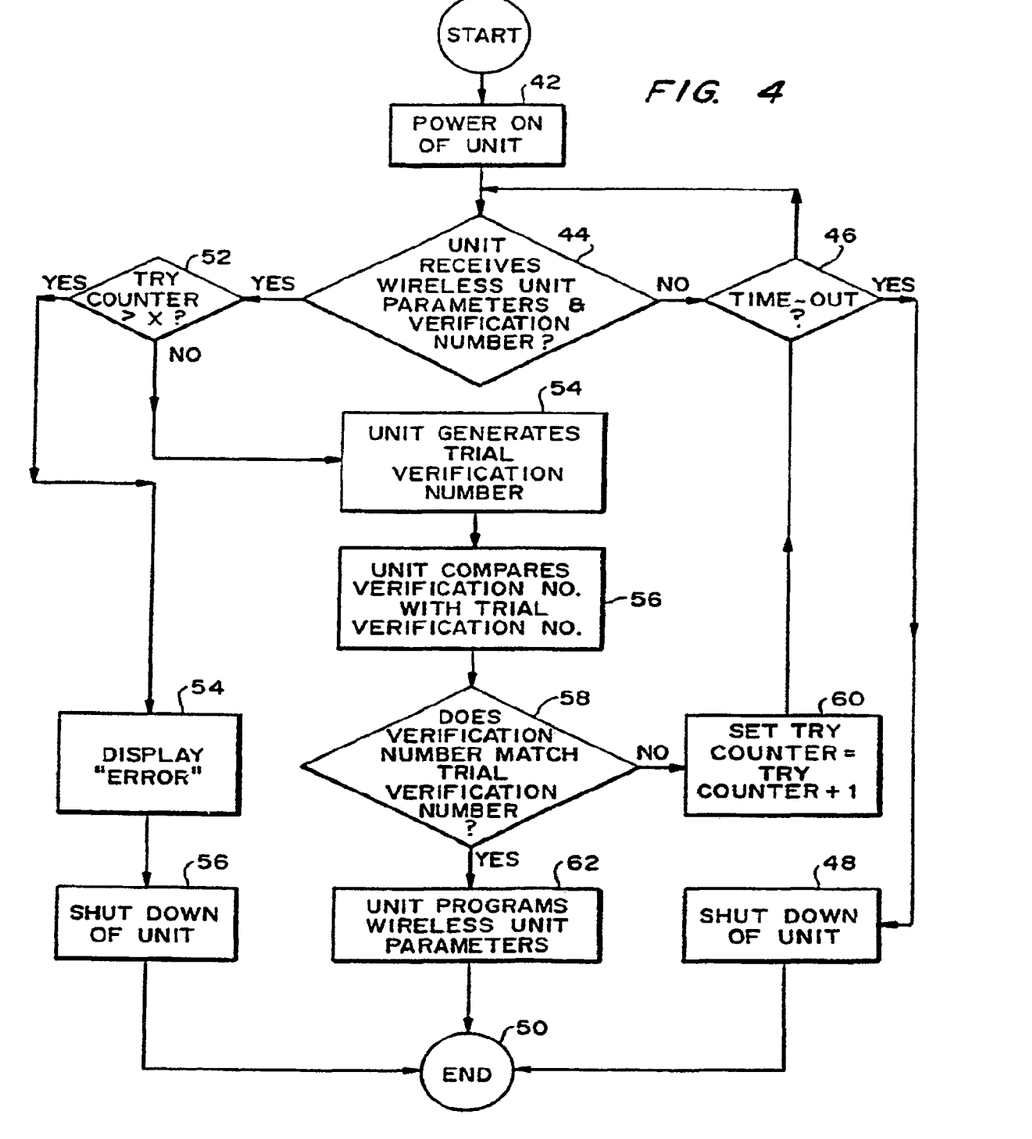
FIG. 4 is a flow chart illustrating an exemplary method of over-the-air programming or activation of a wireless unit.

Assume the wireless unit 10 includes the information it needs to administer an authentication process pursuant to exemplary embodiments of the present invention with respect to information received OTA. For example, the unit includes the stored key 28 and the A-algorithm 34 to generate a trial verification number 36.

Referring to FIG. 4, after start 40, the customer may charge the battery of the wireless unit 10 and otherwise take steps to power-on the unit as noted in block 42. At this point, the wireless unit 10 engages in communication with an appropriate service center of the service provider so as to receive OTA the appropriate information necessary to activate the wireless unit on the network or system of the service provider. In the course of this communication, the wireless unit 10 provides its identifier such as its ESN to the service provider.

To activate the wireless unit, the service provider executes an AUTH_Verify generation procedure which includes using the wireless unit's ESN to generate a key (as described above and in connection with FIG. 2). The service provider obtains or creates the wireless unit parameters to be transmitted to the wireless unit. The wireless unit parameters are used with the key to generate a verification number (as described above and in connection with FIG. 3). Optionally, a checksum also may be used as input to the algorithm that generates the verification number.

The service provider transmits information OTA to the unit 10, and preferably, transmits wireless unit parameters and the verification number. Preferably, the wireless unit parameters are the appropriate NAM parameters for this wireless unit, and include the parameters described in Table 1 above. In an exemplary embodiment, the service provider transmits the information in a NAM Download message with the verification number as an eighteen bit AUTH_Verify in the SSD_S parameter field of the NAM download message. The 64 bit SSD_S parameter field may be assigned with forty-five of the bits reserved, a bit for the subsidy lock designation, and the aforementioned eighteen bit AUTH_Verify for the verification number.

Referring to FIG. 4, in check block 44 the wireless unit determines whether it has received information, particularly, wireless unit parameters and a verification number. If not, then in optional check block 46, the wireless unit may determine whether time has expired with respect to programming or activation of the unit. If the unit has timed-out, then in block 48 the unit may shut down and the exemplary process ends in block 50. If the unit has not timed-out, then the process returns to check block 44 and continues to monitor whether information has been received.

Referring again to check block 44, when the wireless unit determines information has been received, then in optional check block 52, the wireless unit determines whether the number of tries to program or activate the unit has exceeded some number "X". An exemplary embodiment allows one-hundred tries to activate the unit. If the number of tries has been exceeded, then in block 54 the wireless unit 10 displays "ERROR" or other similar message on its display 12. In block 56, the wireless unit 10 shuts itself off or down by powering-off, and in block 50 the exemplary process ends. If the number of tries has not been exceeded, then with block 54 the wireless unit begins its part in the authentication process.

In block 54, the wireless unit generates a trial verification number as described above in connection with FIGS. 2 and 3. In block 56, the wireless unit compares the trial verification number with the received verification for a match. In block 58, a check is made to determine whether a match has been found. The trial verification number generated by the wireless unit is specific to the unit, and may even be unique to the unit, based on the use of the ESN (or other identifier) of the wireless unit in the generation of the trial verification number. A match between the trial verification number and verification number preferably is an identical match. For example, the verification number and the trial verification number should match. The match need not be identical. Alternatively, the trial verification number and verification number may match when the comparison finds that some predefined relationship between the trial verification number and the verification number is satisfied. In addition, a "match" may include the circumstance where the trial verification number has a correspondence or other relationship to the verification number.

If a match is not found, then in optional block 60 the wireless unit advances the try counter by one ("try counter+ 1") and proceeds to optional check block 46 (time-out?) described above. If a match is found in check block 58, then in block 62 the wireless unit uses the wireless unit parameters for programming the wireless unit. The programming of the wireless unit may include activation of the wireless unit on the network of the particular communication system having satisfied the authentication process. The authentication process then ends in block 50. In an exemplary embodiment, if the match is found, then the mobile unit may accept the NAM Commit Request message via an R-Data Accept. If no match is found (invalid AUTH_Verify), then the unit rejects the NAM Commit Request message via an R-Data Reject specifying an R-Cause value corresponding to "mandatory information element error" (96).

In an exemplary embodiment using the optional checksum, after a match is found in check block 58, the wireless unit may take action to validate the checksum. If the checksum is validated, then the authentication process proceeds to the programming of block 62. If the checksum is not validated, then the authentication process may proceed to option block 60 of advancing the try counter by one.

In summary, the present invention advantageously provides a wireless unit whose purchase may be subsidized by a particular service provider, and which may be programmed or activated over-the-air (OTA) only by the particular service provider on its network so the service provider may recoup its subsidy and otherwise derive benefits from the delivery of wireless services to the wireless unit.

In addition, the present invention advantageously provides methods and apparatus whereby a wireless unit may be locked against unauthenticated OTA programming so as not to allow for the circumvention of the lock. In particular, the present invention provides methods and apparatus to allow for a wireless unit, which may be unlocked so as to be programmed OTA only by a particular service provider, and particularly, without the need for the manufacturer of the wireless unit or the service provider to exchange information as to the unlocking process.

Even more particularly, the present invention provides methods and apparatus that avoid the need for a service provider and/or a manufacturer to set up, maintain, and/or transmit an authentication key table, an ESN to SSD_S list, or the like with respect: (1) to information included in the wireless unit; (2) to information that correlates an identifier such as an ESN of a particular unit to values such as SSD_S or the like; and/or (3) to the process of locking/unlocking the unit. Yet even more particularly, the present invention provides methods and apparatus with respect to a wireless unit whose unlocking process is not distributed except to authorized person(s), which does not include a back door into its programming so that unauthorized unlocking of the wireless unit is avoided, and whose lock cannot generally be broken such as through breaking a stored key that leads to the unlocking of the wireless unit.

Given the foregoing disclosure of the exemplary embodiments, other embodiments of the present invention will suggest themselves to those skilled in the art. Therefore, the scope of the present invention is to be limited only by the claims below.

We claim:

1. A unit, comprising:
   a control that receives a verification number from a service provider, the verification number generated in part via an identifier of the unit and without employment of an authentication key table that correlates unit identifiers with authorization keys of the unit; and
   a processor, operatively connected to the control, the processor facilitates generation of a trial verification number in part based on the verification number, and facilitates comparison of the trial verification number with the verification number, to determine whether a predefined relationship is satisfied, wherein generation of the verification number includes division of a secret code by the identifier of the unit, the generation of the verification number is executed at least in part by a device other than the unit, and the verification number is loaded by the unit.

2. The unit of claim 1, wherein the identifier comprises an identifier unique to the unit.

3. The unit of claim 1, wherein the identifier comprises an electronic serial number of the unit.

4. The unit of claim 1, wherein the control receives the verification number and a system identification number from a selected network to effect activation of the unit on the selected network based on the system identification number.

5. The unit of claim 1, wherein the unit comprises a wireless unit and the identifier comprises an electronic serial number of the unit.

6. The unit of claim 1, wherein the division of the secret code by the identifier of the unit results in a remainder and the remainder is the verification number.

7. A method, comprising:
receiving a verification number by a unit from a service provider, the verification number generated by the service provider via an authorization algorithm, including dividing a secret code by an identifier of the unit and executed at least in part by a device other than the unit, and without employing an authentication key table that associates wireless units with authorization keys;
loading the verification number by the unit;
generating a trial verification number by a processor of the unit in part based on the verification number; and
comparing the trial verification number with the verification number to determine whether a predefined relationship is satisfied.

8. The method of claim 7 further comprising employing an identifier unique to the unit as the identifier of the unit.

9. The method of claim 8 further comprising employing an electronic serial number of the unit as the identifier.

10. The method of claim 7, further comprising:
receiving a system identification number from a selected network; and
based on unlocking of the unit, activating the unit on the selected network.

11. A processor of a unit that facilitates execution of computer executable instructions configured to perform operations, the operations comprising:
receiving a verification number by the unit from a service provider, the verification number generated in part via an authorization algorithm, including dividing a secret code by an identifier of the unit and executed at least in part by a device other than the unit, and without employing an authentication key table that associates wireless units with authorization keys;
loading the verification number by the unit;
generating a trial verification number by the processor of the unit in part based on the verification number; and
comparing the trial verification number with the verification number, to determine whether a predefined relationship is satisfied.

12. The processor of claim 11, the operations further comprising:
receiving a system identification number from a selected network; and
based on unlocking of the unit, activating the unit on the selected network.

13. A communication unit, comprising:
a memory having a verification number stored therein, the verification number generated from an algorithm that uses at least a secret code for a particular network and an identifier of the communication unit, wherein the verification number is further generated without employment of an authentication key table that correlates unit identifiers with authorization keys of the communication unit, the algorithm includes division of a secret code by the identifier of the communication unit, the algorithm used to generate the verification number is run by a device other than the communication unit, and the verification number is loaded by the communication unit; and
a control adapted to receive the verification number.

14. The communication unit of claim 13, wherein the identifier comprises an identifier unique to the communication unit.

15. The communication unit of claim 13, wherein the identifier comprises an electronic serial number of the communication unit.

16. The communication unit of claim 13, wherein the communication unit is restricted from communicating when the communication unit is in a locked state.

17. A non-transitory computer readable medium comprising computer-executable instructions that, in response to execution, cause a computing system to perform operations, comprising:
receiving a verification number from a service provider, the verification number generated in part via an identifier of a unit and without employment of an authentication key table that correlates unit identifiers with authorization keys of the unit, wherein the verification number is generated at least in part by a device other than the unit and the verification number is loaded by the unit;
dividing the secret code by the identifier of the unit to obtain a remainder that represents the verification number; and
generating a trial verification number in part based on the verification number.

18. The non-transitory computer readable medium of claim 17, the generating includes comparing the trial verification number with the verification number, to determine whether a predefined relationship is satisfied.

19. The non-transitory computer readable medium of claim 17, wherein the generating employs an identifier in a mathematical operation.

* * * * *